United States Patent
Peng (10) Patent No.: US 8,900,718 B2
(45) Date of Patent: Dec. 2, 2014

(54) ROOFING MEMBRANES AND METHODS FOR CONSTRUCTING

(71) Applicant: Johns Manville, Denver, CO (US)

(72) Inventor: Lichih R Peng, Littleton, CO (US)

(73) Assignee: Johns Manville, Denver, CO (US)

(*) Notice: Subject to any disclaimer, the term of this patent is extended or adjusted under 35 U.S.C. 154(b) by 20 days.

(21) Appl. No.: 13/706,065

(22) Filed: Dec. 5, 2012

(65) Prior Publication Data

US 2014/0150960 A1   Jun. 5, 2014

(51) Int. Cl.
*B32B 27/08* (2006.01)
*B29C 47/00* (2006.01)
*B32B 27/00* (2006.01)
*E04D 5/10* (2006.01)

(52) U.S. Cl.
CPC .. *E04D 5/10* (2013.01); *B32B 27/00* (2013.01)
USPC ...................... 428/516; 156/244.11

(58) Field of Classification Search
None
See application file for complete search history.

(56) References Cited

U.S. PATENT DOCUMENTS 5,902,854 A * 5/1999 Kelley et al. ............... 525/101
2010/0143651 A1 * 6/2010 Silvis et al. ................ 428/141

* cited by examiner

*Primary Examiner* — Sheeba Ahmed
(74) *Attorney, Agent, or Firm* — Robert D. Touslee (57) ABSTRACT

Embodiments of the invention provide improved roofing membranes and methods and systems involving the same. According to one embodiment, a roofing membrane laminate is provided. The roofing membrane laminate includes a first membrane layer that includes a thermoplastic polyolefin material and a second membrane layer positioned atop the first membrane layer and bonded thereto. The second membrane layer includes a thermoplastic polyolefin material and an acrylate additive blended with the thermoplastic polyolefin material. The acrylate additive is blended with the thermoplastic polyolefin material while both materials are resins and is added so as to comprise 10% by weight or less of the blended resins. The acrylate additive includes an ethylene backbone chain and an acrylate bonded with the ethylene backbone chain.

24 Claims, 5 Drawing Sheets

ROOFING MEMBRANES AND METHODS FOR CONSTRUCTING

BACKGROUND OF THE INVENTION

This invention relates generally to roofing membranes. More specifically the invention relates to roofing membranes having one or more additives that enhance properties of the roofing membrane.

Roofing membranes are commonly used for roofing systems of building and structures. Roofing membranes are often applied to the building or structure's roof to prevent leaks and/or to provide aesthetic appeal. Roofing membranes are commonly made of various synthetic rubber materials, modified bitumen, or thermoplastic materials.

A common type of roofing membrane is a thermoplastic polyolefin or TPO membrane. These membranes are often white, but may be made in various other colors or shades, such as grey, black, and the like. White TPO roofing membranes are often used to provide a pleasing appeal to the building and/or to reflect radiation and thereby minimize heat island effects. TPO roofing membranes are prone to weathering or degradation overtime, however, and may begin to collect dust, soot, and other debris. This material is normally easily removed from new TPO membranes, but may be more difficult to remove over time due to the effects or weathering. As such, the dust, soot, and other debris may remain on the surface of the TPO membrane affecting its overall appearance and functionality. For example, the TPO membrane may appear dull white or brownish-grey. The thermal conductivity and/or heat reflectance of the TPO membrane may also increase due to the darker appearance of the membrane.

BRIEF SUMMARY OF THE INVENTION

Embodiments of the invention provide roofing membranes having improved properties over conventional membranes. For example, the roofing membranes described herein may exhibit increased resistance to weather or degradation, which may affect the membranes appearance and/or functional ability over an extended period of time. The membranes may be less prone to retaining dust, soot, or other debris that contacts the membranes' surfaces. The membranes may also exhibit enhanced weldability, strength, fire resistance, and/or other properties.

According to one aspect, a roofing membrane laminate having improved heat reflective properties is provided. The roofing membrane laminate may include a first membrane layer that includes a thermoplastic polyolefin material and a second membrane layer positioned atop the first membrane layer and bonded thereto. The second membrane layer may include a thermoplastic polyolefin material and a copolymer or acrylate additive blended with the thermoplastic polyolefin material. The copolymer additive may be blended with the thermoplastic polyolefin material while both materials are in a resin state or form and may be added so as to comprise 10% by weight or less of the blended resins. The copolymer additive may include an ethylene backbone chain that is able to bond with the thermoplastic polyolefin material and an acrylate bonded with the ethylene backbone chain.

According to some embodiments, the acrylate may be included or incorporated within the ethylene backbone chain. In other embodiments, the acrylate may also be grafted or bonded with the ethylene backbone chain as a pendant group. In yet other embodiments, the acrylate may be bonded with the ethylene backbone chain as a pendant group without including any of the acrylate within the backbone chain.

In some embodiments, the copolymer additive may be blended with the thermoplastic polyolefin material so as to comprise 5% by weight or less of the blended resins, or 3% by weight or less of the blended resins. The copolymer additive may also include a maleic anhydride bonded with the ethylene backbone chain. A fire retardant may be bonded with the maleic anhydride pendant group.

In some embodiments, the roofing membrane laminate may also include a third membrane layer. The third membrane layer may also include a thermoplastic polyolefin material and the first and second membrane layers may be positioned atop and bonded with the third membrane layer.

According to another aspect, a roofing membrane is provided. The roofing membrane may include a thermoplastic polyolefin material and an acrylate additive blended therewith while both materials are resins so as to comprise 10% by weight or less of the blended resins. In some embodiments, the acrylate additive may be blended with the thermoplastic material so as to comprise 5% by weight or less of the blended resins, or 3% by weight or less of the blended resins. The thermoplastic polyolefin material may include polyethylene, polypropylene, or a combination thereof according to some embodiments. The acrylate additive may include an ethylene chain and an acrylate group bonded with the ethylene chain.

The acrylate additive may also include a maleic anhydride bonded with the ethylene chain. A fire retardant, such as magnesium hydroxide, aluminum tri-hydrate, and the like may be bonded with the maleic anhydride. The acrylate additive may be disposed toward a major surface of the roofing membrane so as to form a polyacrylate coating, layer, or finish on the major surface of the roofing membrane.

According to another aspect, a method of making a roofing membrane is provided. The method may include providing a thermoplastic polyolefin material and blending an acrylate additive with the thermoplastic polyolefin material so that the acrylate additive comprises 10% by weight or less of the blended material, 5% by weight or less of the blended material, 3% by weight or less of the blended material, and the like. The acrylate additive may include an ethylene chain and an acrylate group bonded with the ethylene chain.

The method may also include forming the blended material into a substantially flat sheet, such as by extruding the blended material through a die. In some embodiments, the acrylate additive may migrate toward a major surface of the blended material during extrusion so that the roofing membrane comprises a polyacrylate coating, layer, or finish on its major surface or both major surfaces.

The acrylate additive may also include a maleic anhydride bonded with the ethylene chain. In such embodiments, the method may further include blending a fire retardant with the thermoplastic material. The fire retardant may bond with the maleic anhydride.

The method may additionally include coupling the roofing membrane with a roof surface. In some embodiments, a portion of the roofing membrane may be overlaid with an additional roofing membrane and the two membranes may be heat welded along the overlapping portion.

BRIEF DESCRIPTION OF THE DRAWINGS

The present invention is described in conjunction with the appended figures.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

The roofing membranes described herein are typically made of thermoplastic materials. An exemplary such roofing membrane is made of olefin or polyolefin and is commonly known by the trade name Thermoplastic Olefin, Thermoplastic PolyOlefin, or simply TPO. Other thermoplastic membranes include Polyvinyl Chloride (CPA/PVC), Chlorinated Polyethylene (CPE), and the like. For convenience the roofing membranes described herein will be referred to generally as Thermoplastic PolyOlefin or TPO roofing membranes, although it should be realized that the embodiments are not limited to these specific types of membranes.

The term Thermoplastic PolyOlefin or TPO may describe various roofing membranes configurations. For example, in one embodiment, a TPO roofing membrane may have one or more polymers blended with one or more fillers. The membrane may include some combination of the following materials: polypropylene, polyethylene, block copolymer polypropylene, rubber, plasticizers, fiberglass, carbon fiber, fire retardants, and the like. In another embodiment, a TPO roofing membrane may have a more pure polymer blend without or with very few fillers. For example, the membrane may include mainly polypropylene or polyethylene or some combination of these polymers with little to no fillers, although in some embodiments, these membranes may include some amount of a filler, such as a fire retardant.

Figure 6:
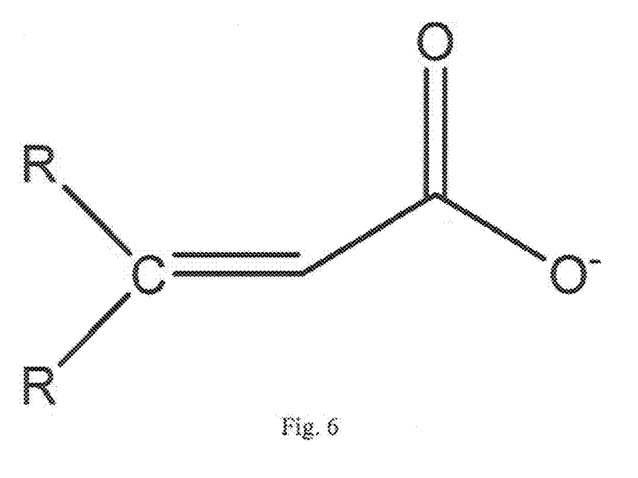
FIG. 6 illustrates the anion portion of acrylic acid according to an embodiment of the invention.

The term acrylate is also used herein. This term is commonly understood to be the anion portion of acrylic acid as shown in FIG. 6 and may describe various compounds including: acrylic acid, methacrylic acid, various salts and esters of acrylic and/or methacrylic acid, and the like. It should be understood that the term is not limited to any specific compound herein unless explicitly claimed or described.

Embodiments of the invention provide roofing membranes having one or more additives that improve one or more properties of the roofing membranes. According to one embodiment, the roofing membranes described herein exhibit less sign of wear and/or degradation over time, thereby allowing the color and/or brightness of the roofing membrane to remain intact even after an extended period of time. For example, roofing membranes are often manufactured to have a white appearance for both aesthetic and functional purposes. The white appearance may be used to enhance the look or appearance of a building or structure they are coupled with, such as by providing a brilliant white roofing surface. In addition, the roofing membranes may be used to reflect radiation or heat, which may reduce urban heat island effects.

New roofing membranes typically have a low surface friction coefficient, which allows the surface to remain relatively clean and free of dust, soot, debris, and the like. For example, dust, soot, debris, and the like easily wash away with rain or water so that the surface remains relatively free of these materials and is able to maintain its appearance and other functional properties. The low surface friction also enables the surface to be easily wiped or brushed clean of these materials.

After a period of time, however, the roofing membranes may be prone to losing the desired appearance and/or heat reflection properties due to a collection and retention of dust, soot, debris, and the like on the surface. These materials may be retained due to an increase in friction of the roofing membrane surface. The increased friction may result from weathering or degradation of the membrane over time, such as by acid rain, abrasion, ultraviolet or other radiation exposure, and the like. The retained materials may cause the surface to have a dull greyish or brownish white appearance, which may affect the membrane's ability to reflect heat and radiation. A decreased whiteness of the roofing membrane may also result in the membrane absorbing more radiation and, thus, increasing in temperature, which affects the building's solar heat gain.

According to some embodiments, the roofing membranes described herein may include an additive or a filler material that reduces the effects of weathering or degradation and/or improves the whiteness and brightness of the membrane even after an extended period of time. The additive or filler materials may allow the roofing membrane to retain a low surface friction coefficient so that collected dust, soot, debris, and the like may be easily wiped off or washed off by rain or water. The additive may include an acrylate that is able to both bond with the roofing membrane material and provide a low friction surface. In some embodiments, the acrylate migrates toward the outer surfaces of the roofing membrane during manufacture so that a substantial portion of the acrylate is located at or near the surface of the membrane. In an exemplary embodiment, the acrylate may be a relatively pure acrylic acid, which may provide a smooth shiny surface on the surface of the roofing membrane. In another embodiment, methacrylate may be used or silicon or Teflon may be used.

The additive may be a copolymer having an ethylene component and an acrylate component, such as a compound or backbone that includes repeating polyethylene compounds and acrylate compounds or an acrylate group that is bonded with a polyethylene backbone chain. The polyethylene compound may bond with the polymer material of the roofing membrane, such as olefin or polyolefin. The ethylene may function to bond the acrylate with the polymer of the roofing membrane, which bonding may otherwise be difficult. The additive may also include one or more other compounds included within the backbone chain or attached or grafted as pendant groups to the ethylene backbone. For example, in one embodiment, a maleic anhydride compound is included within the backbone chain or coupled with the ethylene backbone. The maleic anhydride may bond with other filler materials of the roofing membrane, such as fire retardants, to help homogenize and diffuse the filler materials throughout the roofing membrane and thereby improve the strength or other properties of the roofing membrane. According to one embodiment, the maleic anhydride is able to bond with magnesium hydroxide, aluminum tri-hydrate, Titanium Dioxide (TiO2), talc or other lubricants, and the like. The use of the maleic anhydride may reduce the need for emulsifiers, such as stearic acid, to be used.

The additive may also improve other properties of the roofing membrane. For example, the acrylate additive may improve the weldability of the roofing membrane by lowering the melting temperature of the roofing membrane and thereby broaden the welding temperature of the structure. The additive may enable the roofing membrane to easily bond with other membranes that may or may not include similar additives. The additive may also improve the fire resistance of the roofing membrane by synergistically bonding with fire retardant fillers (e.g., magnesium hydroxide, aluminum tri-hydrate, and the like) and/or forming a protective char layer during a fire. The formed char layer may function to shield the membrane from further fire damage and/or limit flame spread. The additive may likewise bond with other fillers of the roofing membrane to enhance the overall strength of the membrane.

Figure 1:
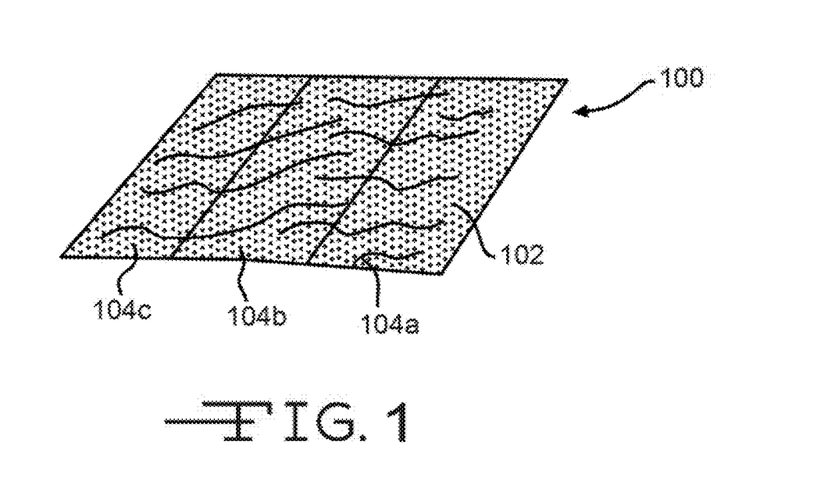
FIG. 1 illustrates a roofing system including a plurality of roofing membranes coupled together according to an embodiment of the invention.

Having described embodiments of the invention generally, these and other aspects of the invention will be realized with references to the figures, which are described below. Referring now to FIG. 1, illustrated is a roofing system 100. Roofing system 100 includes a plurality of roofing membranes 104a-c that are coupled together, such as by heat welding, to form a single structure that is coupled with a roof's surface. Typically a portion of adjacent roofing membranes (e.g., 104a & b) overlap and are heat welded along this overlapping portion. The roofing system 100 is coupled with the roof's surface using conventional attachment means, such as adhesives, mechanical fasteners, ballasts, and the like.

Roofing system 100 is typically made of thermoplastic roofing membranes, such as TPO membranes, which offer several advantages over other similar membranes. For example, TPO membranes often last at least 20 years. Another property of TPO membranes is the aesthetic appearance they provide, which is often brilliant white, but may also include grey, black, and the like. White TPO membranes are often used for their ability to reflect heat and radiation and thereby lower or minimize the overall temperature of the roof surface and the structure itself.

Figure 2:
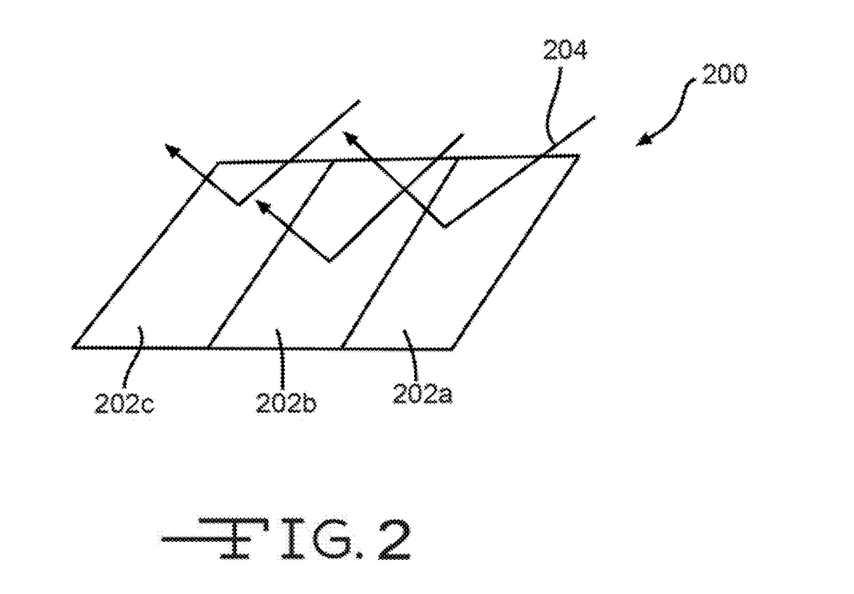
FIG. 2 illustrates the roofing system of FIG. 1 reflecting radiation incident upon the roofing system's surface according to an embodiment of the invention.

FIG. 2 illustrates a roofing system 200 including a plurality of roofing membranes 202a-c reflecting radiation that contacts the roofing membrane surface. Specifically, FIG. 2 shows a plurality of rays or beams 204 contacting roofing system 200 and reflecting off the surface of roofing system 200. The reflective nature of roofing system 200 may be due to, or enhanced, by the white color of roofing system 200.

Dust, soot, and other debris may collect on the surface of such roofing systems. For example, FIG. 1 illustrates such dust, soot, or debris 102 (hereinafter debris 102) collecting atop a major surface of the roofing membranes 104a-c of roofing system 100. The debris 102 may collect atop roofing system 100 from dust storms, nearby factories, periods of draught or little rain, from nearby animals or plants, and the like. Debris 102 may alter the aesthetic appearance of roofing system 100 by making the individual roofing membranes 104a-c appear dullish brown/gray white. This may hinder roofing system 100's ability to reflect radiation and/or may cause roofing system 100 to absorb heat leading to an increase in heat island effects.

Conventional roofing membranes may retain debris 102 making it difficult to remove. As a result, conventional roofing systems that include such roofing membranes may provide less aesthetic and functional appeal due to being dullish white in appearance and having a decreased ability to reflect radiation. The debris 102 may be retained due to an increase in the surface friction of the roofing membranes, which is commonly caused by weathering or degradation of the membrane material over time, such as by acid rain, abrasion, prolonged exposure to radiation, and the like.

The roofing membranes of the present invention are more able to resist weathering or degradation and, thus, are able to provide a longer lasting aesthetic look and functional appeal. According to one embodiment, the degradation effects are resisted or minimized by maintaining or minimizing degradation of a low surface friction over all or a substantial portion of the life of the roofing membrane. This allows the debris 102 on the roofing membrane surface to be easily removed by wiping or brushing the debris off, or by spraying the surface with water. The debris 102 may also be naturally removed by rain water. Because the debris 102 may be easily removed over the life of the roofing membrane, the roofing membrane is able to maintain its brilliant white appearance over its life. The roofing membrane also absorbs less heat over its lifetime and is more effective at reflecting radiation and, thus, more effective at combating urban heat island effects.

The roofing membrane is able to combat degradation by blending an additive with the thermoplastic material, such as thermoplastic polyolefin. According to one embodiment, an acrylate additive is blended with a resin of the thermoplastic material, such as by melting the two components and mixing them together with an auger. The blended resin may be subsequently cooled and/or extruded to form a roofing membrane that includes the additive. The acrylate additive may be blended with the thermoplastic material so that the additive comprises 10% by weight or less of the blended resin. In another embodiment, the acrylate additive is blended with the thermoplastic material to comprise 5% by weight or less of the blended resin. In another embodiment, the acrylate additive is blended with the thermoplastic material to comprise 3% by weight or less of the blended resin. If more than 10% by weight of the acrylate additive is used, the roofing membrane may not properly bond with an adjacent membrane. Similarly, if less than 1 or 2% by weight of the acrylate additive is used, the low surface friction may not be maintained and/or the roofing membrane may be prone to weathering and degradation.

Figure 4A:
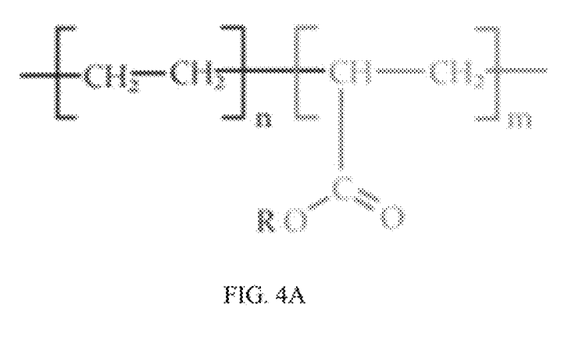
FIGS. 4A-C illustrate various copolymer additive compositions according to an embodiment of the invention.
Figure 4B:
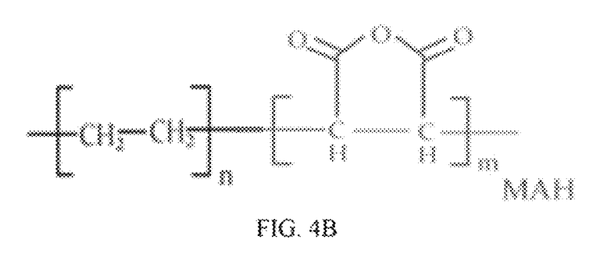
Figure 4C:
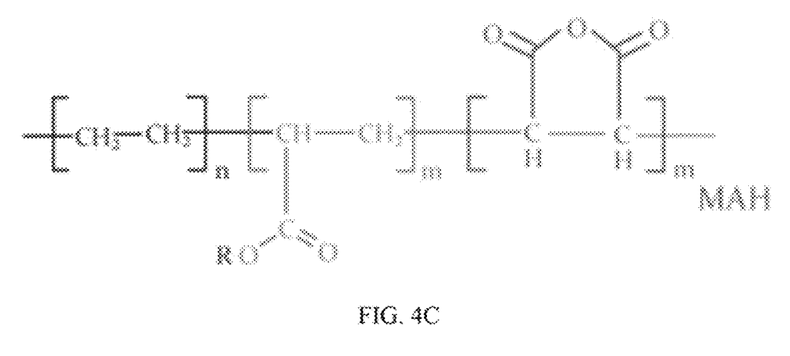

As shown in FIGS. 4A-C, the acrylate additive may be a copolymer that includes a combination of polyethylene and an acrylate. The acrylate is typically an anion portion of acrylic acid as shown in FIG. 6. The acrylate may include acrylic acid, methacrylic acid, various salts and esters of acrylic and/or methacrylic acid, and the like, or any combination thereof. As shown in FIG. 4A, in one embodiment, the acrylate may be grafted or included within a polyethylene backbone to form a compound chain. The compound chain may include any number of polyethylene units and acrylate units. For example, in one embodiment, the chain includes multiple polyethylene units and few acrylate units. Alternatively, the chain may include multiple acrylate units and few polyethylene units so that the polyethylene is essentially grafted or included within an acrylate backbone. In other embodiments, the difference in the number of polyethylene units and acrylate units may not be that significant. FIG. 4A illustrates an acrylic acid included within the polyethylene chain, although it should be realized that the embodiments described herein are not limited to acrylic acid and that any acrylate may be used, or multiple acrylates may be used.

As shown in FIG. 4B, in some embodiments, the acrylate may be included as a pendant group bonded with the polyethylene backbone. In some embodiments, the R groups may include $CH_3$, $C_2H_5$, $C_4H_9$, and the like (i.e., methyl, ethyl, butyl, and the like). In some embodiments, a butyl group may be used for increased compatibility with TPO material. Acrylic acid is again illustrated as the pendant group although any acrylate may be used. As shown in FIG. 4C, the compound chain may include some combination of acrylate pendant groups bonded with the polyethylene backbone and acrylate units included within the polyethylene backbone. As described previously, the compounds of FIGS. 4B and 4C may include any number of polyethylene and acrylate units or pendant groups. The ethylene may bond with the polymer material of the roofing membrane, such as by bonding with the polyolefin. The ethylene may likewise couple the acrylate with the polymer material. Such coupling is normally difficult due to the polarity of the acrylate. In this manner, the ethylene may function as a bridge between the polyolefin and the acrylate.

In some embodiments, the acrylate may migrate toward a major surface, or surfaces, of the roofing membrane so as to provide a polyacrylate layer, coating, or finish at or near the major surface. This layer, coating, or finish may reduce the surface friction of the roofing membrane and/or improve resistance to weathering or other forms of degradation. The migration of the acrylate toward the roofing membrane's major surface may be increased during manufacturing of the roofing membrane, such as by extruding the membrane through a die or by using an agent that effects such migration. The migration may occur as a result of the polarity of the acrylate units. After migration, a substantial portion of the acrylate may be at or near the roofing membrane's surface to provide the polyacrylate layer, coating, or finish.

The acrylate additive may also improve the weldability and/or strength of the roofing membrane. For example, the acrylate may lower the melting point of the roofing membrane and thereby broaden the heat welding window. As a result, heat welding may be initiated earlier in the welding process. Further, the ethylene units or chain of the additive may improve the weld strength by bonding with the polyolefin material (e.g., polyethylene, polypropylene, and the like) of an adjacent roofing membrane. The ethylene units or chain may improve the weld strength even when an adjacent roofing membrane does not include an acrylate additive.

According to some embodiments, the acrylate additive may also include one or more maleic anhydride units or pendant groups included within or bonded to the compound chain. For example, FIG. 4C further illustrates a maleic anhydride being included within the compound chain and/or being included as a pendant group. The compound chain may include multiple units of the maleic anhydride within the compound chain or coupled thereto as pendant groups. The maleic anhydride may improve the overall strength of the roofing membrane and/or improve other roofing membrane properties by bonding with various filler materials of the roofing membrane. For example, TPO roofing membranes often include various filler materials such as fire retardants. The maleic anhydride can chemically bond to these filler materials to more fully strengthen the roofing membrane. Because the maleic anhydride is included within or bonded to the compound chain, the maleic anhydride is able to homogenize and diffuse and lock the filler materials within the TPO material, which otherwise may be difficult. Stated differently, the maleic anhydride may function as a bridge between the TPO and filler materials. According to one embodiment, the maleic anhydride may be bonded or grafted with the ethylene chain so as to comprise between about 2-5% by weight of the compound chain.

In a specific example, the maleic anhydride may bond with a fire retardant material, which may otherwise not bond with the roofing membrane's polymer material. For example, magnesium hydroxide is a specific type of fire retardant that is used in some TPO membranes. Bonding between the magnesium hydroxide and the polyolefin is generally difficult due to the polarity of the magnesium hydroxide. As such, magnesium hydroxide is typically treated with an acid, such as stearic acid, to enhance the bonding between the polyolefin and the magnesium hydroxide. However, the amount of stearic acid that is used is limited, which usually results in an amount of untreated magnesium hydroxide being mixed with the polyolefin. The maleic anhydride of the additive is able to bond with the magnesium hydroxide, thereby eliminating or reducing the amount of stearic acid that needs to be used. Further, the ethylene chain is able to bond with the polyolefin, which effectively locks the magnesium hydroxide within the TPO roofing membrane.

The acrylate of the copolymer additive may also function to resist or retard a fire. For example, the acrylate bonded with the TPO filler materials (e.g., the flame retardant, mineral fillers, and the like) can form a char, or cause formation of char, upon burning or application of a flame. The formed char may form a protective layer that helps insulate the TPO membrane from further fire damage, such as by limiting or slowing down further flame spread. This feature may allow the TPO roofing membrane to easily pass standard roof membrane flame tests. The resulting TPO membrane blended with the acrylate additive may be stronger and more fire resistant than conventional TPO membranes.

According to one embodiment, one or more of the roofing membranes 104a-c of roofing system 100 of FIG. 1 may include the acrylate additive described herein. In one embodiment, all of the roofing membranes 104a-c include the acrylate additive and are coupled together at overlapping portions. In another embodiment, one or more of the roofing membranes 104a-c do not include the acrylate additive, but are heat welded at overlapping portions with an adjacent roofing membrane 104a-c that does include the acrylate additive, such as when one or more membranes are being replaced.

Figure 5A:
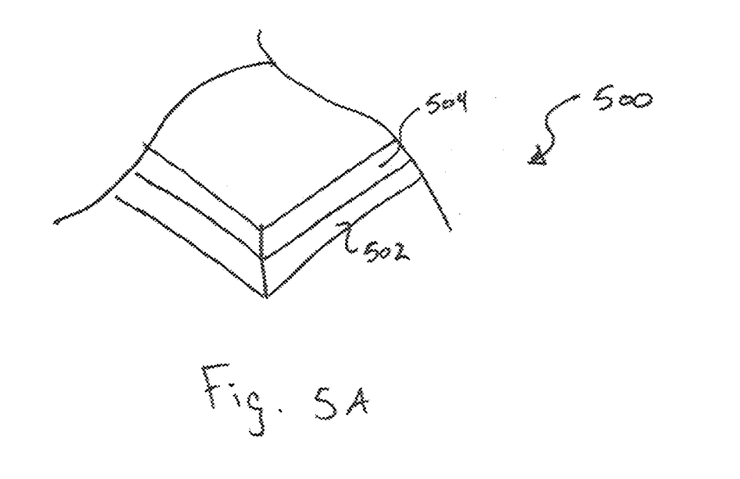
FIGS. 5A & B illustrate various roofing membrane laminates according to an embodiment of the invention.

Referring now to FIG. 5A, illustrated is a roofing membrane laminate 500 having a core 502 and a cap 504. The core 502 and cap 504 layers are typically between about 45 and 85 mils thick and are bonded together, typically by laying the cap atop the core and pressing the layers together while applying heat. The core 502 is usually a conventional or lower grade roofing membrane, such as a conventional or lower grade TPO membrane and may be made of recycled polymers or include various fillers. The cap 504 of laminate 500 is a higher quality TPO material having the acrylate additive described herein. The laminate 500 is applied atop a roof so that the cap 504 faces outward and is exposed to the environment. The cap 504 provides the lower friction surface as described herein so that the color and/or functionality of the roofing membrane is maintained over a substantial portion of the life of the membrane. In some embodiments, the overall cost of the membrane may be reduced by bonding the higher quality cap 504 with the lower quality core 502.

Figure 5B:
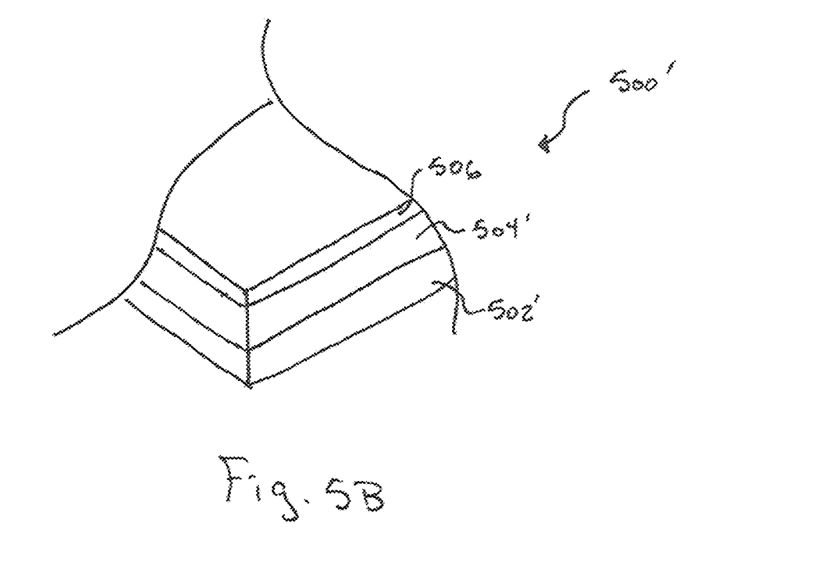

Referring now to FIG. 5B, illustrated is another roofing membrane laminate 500' having a first core layer 502', a second core layer 504', and a film layer 506'. The first core 502' and second core 504' layers are typically between about 45 and 85 mils thick and are bonded together as described previously. The film layer 506', is typically about 10 mils thick and may likewise be bonding atop second core layer 504'. The first core layer 502' and second core layer 504' are usually conventional or lower grade roofing membranes, such as conventional or lower grade TPO membranes and may be made of recycled polymers or include various fillers. The film layer 506' is a higher quality TPO or roofing material having the acrylate additive described herein. The laminate 500' is applied atop a roof so that the film layer 506' faces outward and is exposed to the environment. The film layer 506' provides the lower friction surface as described herein so that the color and/or functionality of the roofing membrane is maintained over a substantial portion of the life of the membrane. As described previously, using the film layer 506' may reduce the overall cost of the roofing membrane.

Although not shown, in some embodiments, the roofing membrane includes a single layer that includes the acrylate additive and functional properties described herein. The single layer may range in some embodiments between 45 and 160 mils thick. Using a single layer may eliminate a processing step by removing the requirement to couple two or more layers together.

Figure 3:
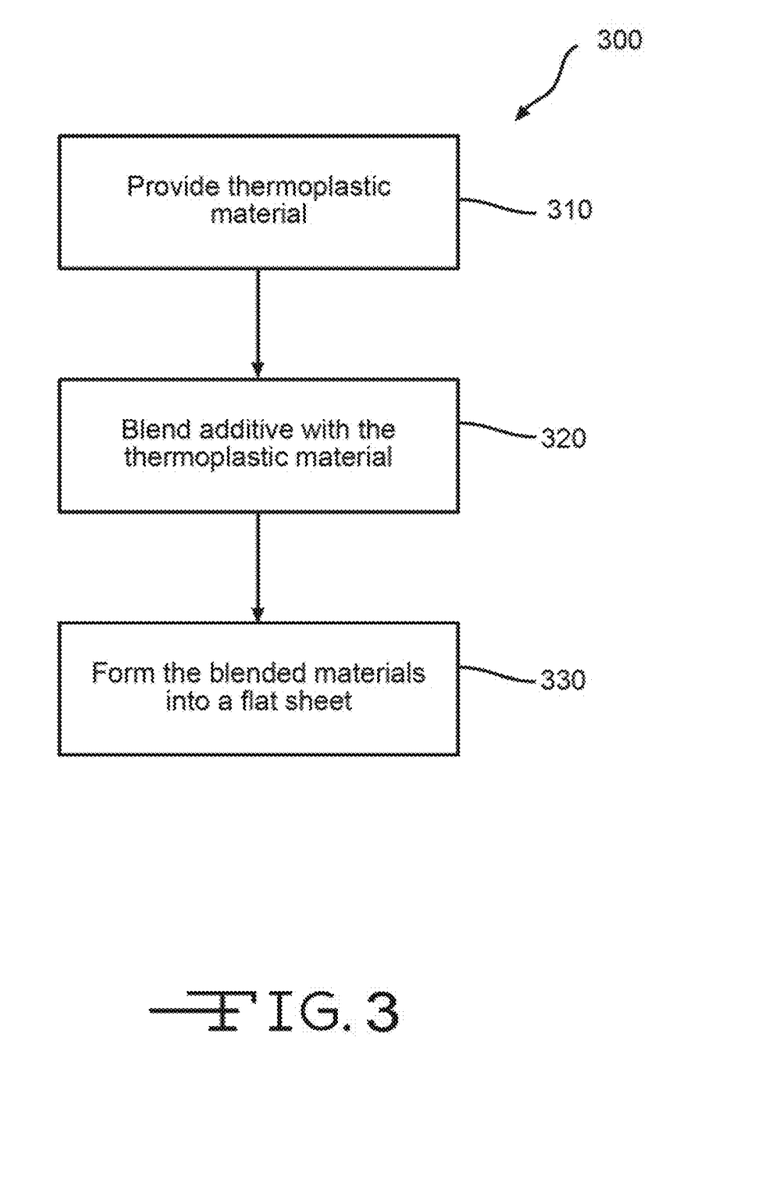
FIG. 3 illustrates a method of making a roofing membrane according to an embodiment of the invention.

Referring now to FIG. 3, illustrated is a method 300 of making a roofing membrane. At block 310, a thermoplastic material is provided. According to one embodiment, the thermoplastic material is olefin or polyolefin so that the resulting roofing membrane is a TPO membrane. At block 320, an acrylate additive is blended with the thermoplastic material. The acrylate additive may be blended with the thermoplastic material so as to comprise 10% by weight or less of the blended material, 5% by weight or less of the blended material, or in some embodiments, 3% by weight or less of the blended material. As described herein, the acrylate additive may include an ethylene chain and an acryloyl or acrylate group bonded therewith. At block 330, the blended material is formed into a substantially flat sheet, such as by extruding the blended material through a die. The acrylate additive may migrate toward a major surface of the blended material as the material is being extruded through the die so that the resulting roofing membrane includes a layer or coating of the acrylate additive on its surface.

White pigment, such as Titanium Dioxide (TiO2), or another color, may also be blended with the thermoplastic material to give the resulting roofing membrane a desired color and/or other functional properties, such as heat reflectance. The white pigment may be blended with the roofing membrane material (e.g., TPO) so as to comprise between about 2-6%, and more commonly about 3-5%, of the roofing membrane. In some embodiments, the acrylate additive may also include a maleic anhydride bonded with the ethylene chain. In such embodiments, the method may further include blending a fire retardant with the thermoplastic material. The fire retardant may bond with the maleic anhydride as described herein. The maleic anhydride may also bond with the TiO2 pigment and help diffuse and disperse the TiO2 pigment throughout the roofing membrane.

The method may further include coupling the roofing membrane with a roof surface. Similarly, the roofing membrane may be coupled with additional roofing membranes atop the roof surface. For example, the method may additionally include overlaying a portion of the roofing membrane with an additional roofing membrane and heat welding the two roofing membranes together. Heat welding of the adjacent roofing membranes may be improved or enhanced by the acrylate additive. The additional roofing membrane may or may not have an acrylate additive. The coupled roofing membranes may form a roofing system that has improved radiation reflecting properties, improved color or aesthetic appeal, improved membrane strength, improved weathering resistance, improved fire resistance, improved weldability, and the like.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A roofing membrane laminate having improved heat reflective properties, the roofing membrane laminate comprising:
    a first membrane layer, the first membrane layer comprising thermoplastic polyolefin; and
    a second membrane layer positioned atop the first membrane layer and bonded thereto, wherein the second membrane layer comprises:
    thermoplastic polyolefin; and
    a copolymer additive blended with the thermoplastic polyolefin, the copolymer additive being blended with the thermoplastic polyolefin while both materials are a resin so as to comprise 10% by weight or less of the blended resin, wherein the copolymer additive includes:
        an ethylene backbone chain bonded with the thermoplastic polyolefin; and
        an acrylate bonded with the ethylene backbone chain.

2. The roofing membrane laminate of claim 1, wherein the acrylate is included or incorporated within the ethylene backbone chain.

3. The roofing membrane laminate of claim 2, wherein the acrylate is further bonded or grafted with the ethylene backbone chain as a pendant group.

4. The roofing membrane laminate of claim 1, wherein the acrylate is bonded or grafted with the ethylene backbone chain as a pendant group.

5. The roofing membrane laminate of claim 1, wherein the copolymer additive is blended with the thermoplastic polyolefin so as to comprise 5% by weight or less of the blended resin.

6. The roofing membrane laminate of claim 1, wherein the copolymer additive is blended with the thermoplastic polyolefin so as to comprise 3% by weight or less of the blended resin.

7. The roofing membrane laminate of claim 1, wherein the copolymer additive further comprises maleic anhydride bonded with the ethylene backbone chain.

8. The roofing membrane laminate of claim 7, wherein a fire retardant is bonded with the maleic anhydride pendant group.

9. The roofing membrane laminate of claim 1, further comprising a third membrane layer, wherein the third membrane layer comprises thermoplastic polyolefin, and wherein the first and second membrane layers are positioned atop and bonded with the third membrane layer.

10. A roofing membrane comprising:
a thermoplastic polyolefin material; and
an acrylate additive blended with the thermoplastic polyolefin material, the acrylate additive being blended with the thermoplastic polyolefin material while both materials are in a resin form such that the acrylate additive comprises 10% by weight or less of the blended resins.

11. The roofing membrane of claim 10, wherein the thermoplastic polyolefin material comprises polyethylene or polypropylene or a combination thereof.

12. The roofing membrane of claim 10, wherein the acrylate additive comprises:
an ethylene chain; and
an acrylate bonded with the ethylene chain.

13. The roofing membrane of claim 10, wherein the acrylate additive is blended with the thermoplastic polyolefin material so as to comprise 5% by weight or less of the blended resins.

14. The roofing membrane of claim 12, wherein the acrylate additive further comprises a maleic anhydride bonded with the ethylene chain.

15. The roofing membrane of claim 14, wherein the maleic anhydride is bonded with the ethylene chain so as to comprise between about 2-5% by weight of the compound chain.

16. The roofing membrane of claim 14, wherein a fire retardant is bonded with the maleic anhydride.

17. The roofing membrane of claim 16, wherein the fire retardant comprises magnesium hydroxide.

18. The roofing membrane of claim 10, wherein the acrylate additive is disposed toward a surface of the roofing membrane so as to form a polyacrylate coating, layer, or finish on the surface of the roofing membrane.

19. A method of making a roofing membrane comprising:
providing a thermoplastic polyolefin material;
blending an acrylate additive with the thermoplastic polyolefin material so that the acrylate additive comprises 10% by weight or less of the blended material, the acrylate additive comprising:
an ethylene chain; and
an acrylate group bonded with the ethylene chain; and
forming the blended material into a substantially flat sheet.

20. The method of claim 19, wherein the method further comprises blending the acrylate additive with the thermoplastic polyolefin material so that the acrylate additive comprise 5% by weight or less of the blended material.

21. The method of claim 19, wherein the acrylate additive further comprises a maleic anhydride bonded with the ethylene chain, and wherein the method further comprises: blending a fire retardant with the thermoplastic material, wherein the fire retardant bonds with the maleic anhydride.

22. The method of claim 19, wherein forming the blended material into a substantially flat sheet comprises extruding the blended material through a die, wherein the acrylate additive migrates toward a surface of the blended material so that the roofing membrane comprises a polyacrylate coating, layer, or finish on the surface.

23. The method of claim 19, wherein the method further comprises coupling the roofing membrane with a roof surface.

24. The method of claim 23, wherein the method further comprises overlaying a portion of the roofing membrane with an additional roofing membrane and heat welding the two roofing membranes together.

* * * * *